May 20, 1924.

C. R. WILLIAMSON
POTATO OR PEANUT DIGGER
Filed Aug. 5, 1922

Inventor

C. R. Williamson

By Lacey & Lacey, Attorneys

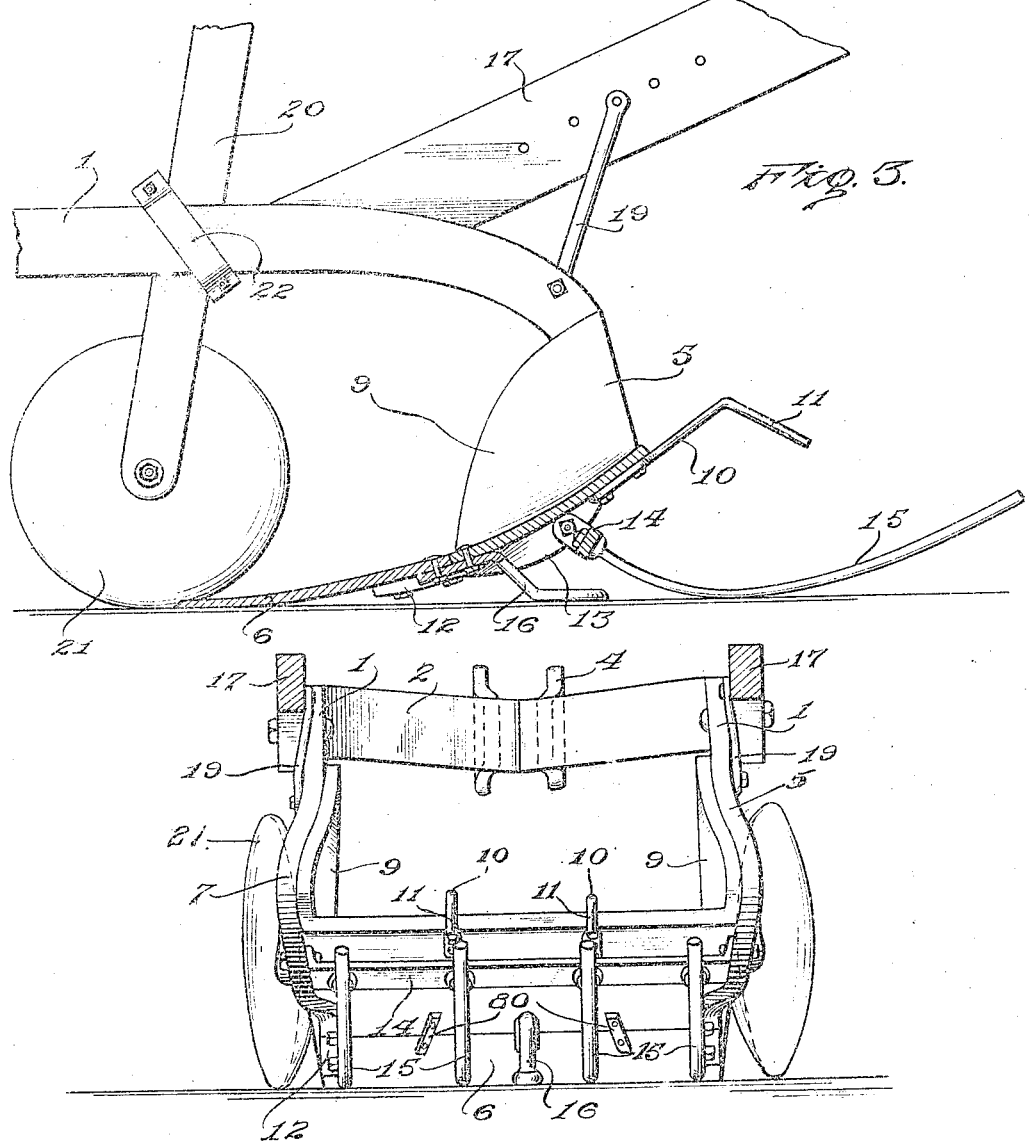

Patented May 20, 1924.

1,494,873

UNITED STATES PATENT OFFICE.

CLARENCE R. WILLIAMSON, OF TREZEVANT, TENNESSEE.

POTATO OR PEANUT DIGGER.

Application filed August 5, 1922. Serial No. 579,915.

*To all whom it may concern:*

Be it known that I, CLARENCE R. WILLIAMSON, a citizen of the United States, residing at Trezevant, in the county of Carroll and State of Tennessee, have invented certain new and useful Improvements in Potato or Peanut Diggers, of which the following is a specification.

The object of my present invention is to provide an agricultural implement especially adapted for the harvesting of potatoes, peanuts, beets and similar crops which will be of simple construction and by the use of which the vines will be cut off and shoved aside and the potatoes or other tubers will be uprooted and separated from the soil so that they may be easily gathered, and a further object of the invention is to provide an implement for the stated purpose by the use of which the tubers will be taken up in hills and separated from the soil without being damaged so that the members suitable for seed may be easily separated from the other members. The invention is illustrated in the accompanying drawings and will be hereinafter fully set forth.

In the drawings—

Fig. 3 is an enlarged central longitudinal section thereof, and

Fig. 4 is an enlarged rear elevation with the handles in transverse section.

Figure 2:
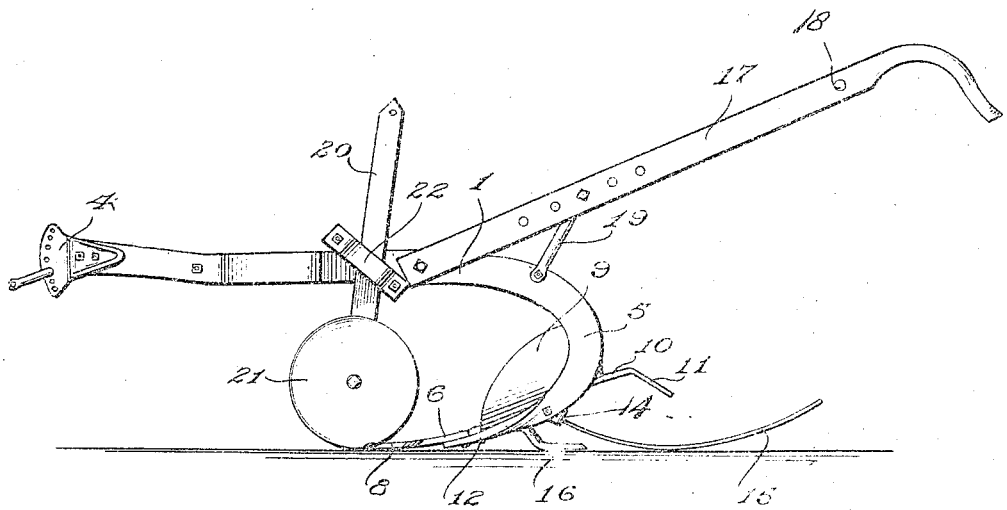
Fig. 2 is a side elevation of the same.

In carrying out my invention, I employ a pair of beams 1 which have their front ends turned laterally so as to converge, as shown at 2, and secured together in advance of the converging portions, as shown at 3, so as to support a clevis 4 to which draft devices may be applied. The beams 1 are curved downwardly and forwardly at their rear ends to constitute standards 5 to which the share 6 is secured and the said standards are given an arcuate formation so as to project slightly outward laterally, as shown most clearly at 7 in Fig. 4, whereby ample clearance for the uprooted hills will be provided. The plow 6 has its cutting edge shaped to provide a central penetrating point 8 whereby it will readily pass through the ground below the roots and will lift the same with the hills of attached soil. The cutter of the plow is formed separate from the main body thereof and connected thereto by straps 80 on the under side, as shown most clearly in Fig. 4. This construction permits the point or cutter to be renewed when necessary without requiring a new plow in its entirety. The plow is inclined upwardly toward its rear, as shown most clearly in Fig. 3, and is provided with wings 9 at its sides whereby the uprooted hills will be prevented from escaping laterally over the edges of the plow. Secured to the under side of the plow at the upper rear end thereof are fingers 10 which extend upwardly approximately as a continuation of the plow share and have their extremities bent sharply downwardly and rearwardly, as shown at 11. The lower extremities of the standards 5 are secured rigidly to the under side of the plow share, as shown at 12, and edge portions of the standards will project below the bottom of the plow share, as shown at 13. To the projecting portions 13 of the standards, I pivotally secure the ends of a cross bar 14 and to the said cross bar I secure a plurality of sifting fingers 15 which, as shown in Figs. 2 and 3, are of an arcuate formation and have both ends above the surface of the soil with their intermediate portions resting thereon. I also secure to the under side of the plow share, in the medial longitudinal plane thereof, a rudder or heel 16 which is adapted to run in the bottom of the furrow made by the plow and thereby prevent tipping downwardly of the rear portion of the plow so that the load on the plow will be not dumped immediately into the furrow in rear of the plow but will be caused to ride upwardly and rearwardly over the plow and over the separating fingers 11.

Handles 17 of the usual form are secured to the beams 1 and are reinforced by a cross bar 18 secured to and extending between the handles, and by braces 19 secured to the beams and the handles, as will be readily understood.

Figure 1:
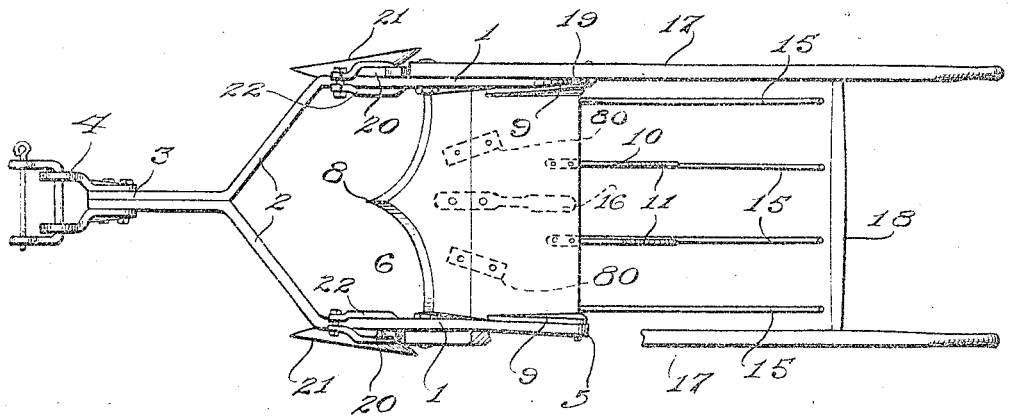
Figure 1 is a plan view of my improved harvester.

The forward ends of the handles are secured to the beams approximately in the vertical transverse plane of the cutting edge of the plow, and immediately in advance of the ends of the handles I secure to the beams colter shanks or supporting standards 20 having colter disks or cutters 21 mounted upon their lower ends and, as shown most clearly in Fig. 1, these cutters or colters are so disposed that they will cut through the vines and branches of the plants and turn the severed portions aside so that they will not pass over the plow share and clog the same. The standards or shanks 20 may be secured upon the beams in any desired manner, and a convenient method is the use of clips 22, as illustrated.

In the use of the implement, the clevis 4 is connected by suitable draft devices or couplings to a team of draft animals or to a tractor and is drawn over the field along the row which is to be harvested. The plow will run in the ground below the hills and will pass under the hills so as to uproot the same and cause them to move upwardly and rearwardly over the share. The side wings 9 of the share project upwardly to a sufficient height to prevent the plants falling laterally from the share and they are bulged or otherwise shaped, as shown clearly in Fig. 4, to fit closely against the standards 5 and provide ample clearance for the uprooted hills. The separating fingers 10 will support the hills so that they will be caused to travel somewhat rearwardly beyond the end of the plow share and the large lumps of dirt will be thereby permitted to fall from the hills and clear the plants. The partially cleared tubers and stems will then fall onto the sifting fingers 15 which will be constantly oscillated as they ride along the bottom of the furrow and will, consequently, agitate the tubers so that all the dirt will be shaken therefrom. Moreover, the arcuate form of these sifting fingers will cause them to push the tubers to the top of the soil so that they ride over the ends of the fingers and are deposited on the top of the row behind the plow.

By the use of my device embodying the lifting fingers and the sifting fingers, the potatoes, peanuts, beets, onions, or other commodities, will be separated from the soil clinging to them and will be collected in an uninjured condition so that the user may subsequently easily separate the products which are to be marketed and those which are to be utilized as seed. My device is simple in the construction and arrangement of its parts, is strong and durable and not apt to get out of order, and should any one part be broken, it may be repaired or renewed without necessitating the repairing or renewing of other parts.

Having thus described the invention, what is claimed as new is:

1. An agricultural implement comprising a plow share having upstanding side wings, lifting fingers secured rigidly to and projecting beyond the rear edge of the share in the plane of the share and having their extremities projecting downwardly, and sifting fingers pivotally attached to the bottom of the share in advance of the rear edge of the same and extending rearwardly therefrom below and beyond the lifting fingers.

2. An agricultural implement comprising a plow share extending upwardly and rearwardly in an inclined position, a heel secured rigidly to the under side of the share and extending downwardly and rearwardly therefrom and having its rear end flattened to run in the furrow and support the share in an inclined position, and a plurality of sifting fingers pivotally attached to the share in rear of the heel to run upon the base of the furrow in rear of the heel.

3. An agricultural implement comprising a pair of beams having downwardly and forwardly projecting standards at their rear ends, a share secured rigidly to the extremities of said standards, the edge portions of the standards projecting below and extending under the share, a cross bar pivoted to and extending between the standards below the share, sifting fingers attached to and projecting rearwardly from the cross bar and resting between their ends in the furrow, and lifting fingers secured to and projecting upwardly from the rear edge of the share and having their rear ends projecting downwardly and rearwardly approximately over the centers of the sifting fingers.

In testimony whereof I affix my signature.

CLARENCE R. WILLIAMSON. [L. S.]